US007089352B2

United States Patent
Regev et al.

(10) Patent No.: US 7,089,352 B2
(45) Date of Patent: Aug. 8, 2006

(54) CAM MODIFIED TO BE USED FOR STATISTIC CALCULATION IN NETWORK SWITCHES AND ROUTERS

(75) Inventors: Alon Regev, Woodland Hills, CA (US); Zvi Regev, West Hills, CA (US)

(73) Assignee: Micron Technology, Inc., Boise, ID (US)

( * ) Notice: Subject to any disclaimer, the term of this patent is extended or adjusted under 35 U.S.C. 154(b) by 421 days.

(21) Appl. No.: 10/326,633

(22) Filed: Dec. 23, 2002

(65) Prior Publication Data

US 2004/0123023 A1  Jun. 24, 2004

(51) Int. Cl.
*G06F 12/00* (2006.01)
(52) U.S. Cl. .......................... 711/108; 365/49
(58) Field of Classification Search ............. 365/49; 711/108
See application file for complete search history.

(56) References Cited

U.S. PATENT DOCUMENTS

| 4,910,668 | A | * | 3/1990 | Okamoto et al. | ........... 711/207 |
| 5,386,528 | A | * | 1/1995 | Ando et al. | ................. 711/207 |
| 5,546,555 | A | * | 8/1996 | Horstmann et al. | ......... 711/207 |
| 6,002,666 | A |   | 12/1999 | Fukano | |
| 6,591,317 | B1 | * | 7/2003 | Schzukin et al. | ............. 710/52 |

* cited by examiner

*Primary Examiner*—Jack A. Lane
(74) *Attorney, Agent, or Firm*—Dickstein Shapiro Morin & Oshinsky, LLP

(57) ABSTRACT

A content addressable memory (CAM) device includes a plurality of entries each having an associated counter. When a CAM entry matches a search word stored in the comparand register of the CAM device, the matching entry's counter may be incremented. Alternatively, if there are multiple matching entries, in some instances only one matching entry has its counter incremented. The counter value can be written or read as part of either the least significant or most significant bits of the CAM entry.

27 Claims, 3 Drawing Sheets

CAM MODIFIED TO BE USED FOR STATISTIC CALCULATION IN NETWORK SWITCHES AND ROUTERS

FIELD OF INVENTION

The present invention relates generally to semiconductor memory devices, and more particularly, a content addressable memory (CAM) being used to process statistical data.

BACKGROUND OF THE INVENTION

An essential semiconductor device is semiconductor memory, such as a random access memory (RAM) device. A RAM allows a memory circuit to execute both read and write operations on its memory cells. Typical examples of RAM devices include dynamic random access memory (DRAM) and static random access memory (SRAM).

Another form of memory is the content addressable memory (CAM) device. A CAM is a memory device that accelerates any application requiring fast searches of a database, list, or pattern. CAMs provide benefits over other memory search algorithms by simultaneously comparing the desired information (i.e., data in the comparand register) against the entire list of pre-stored entries. CAM devices are frequently employed in network equipment, and more specifically, in network routers or switches, where frequently at least a portion of a network address must be searched against a database in order to determine how to further route a packet of data.

There are two types of searches which are of interest, namely a search for the exact match and the partial match search. In the exact match search, an entry stored in the CAM will match the data sample only if the data sample and the entry match bit for bit. In a partial match search, the search may be conducted on only a subset of bits in the word. That is, the CAM cells are permitted to specify a third "don't care" state in addition to the logical "0" and "1" states. When a partial match search is conducted, CAM cells will match a data sample as long as each bit in the entry set at a logical "0" or "1" states match the corresponding portion of the data sample. CAMs which support only exact match circuits are generally known as binary CAMs, while CAMs which also support partial match searches are generally known as ternary CAMs.

In order to perform a memory search, CAMs are organized differently than other memory devices (e.g., DRAM and SRAM). For example, data is stored in a RAM in a particular location, called an address. During a memory access, the user supplies an address and reads or gets data stored at the specified address. In a CAM, however, data is stored in locations in a somewhat random fashion. The locations can be selected by an address bus, or the data can be written into the first empty memory location. Every location has a plurality of status bits that keep track of status information, for example, whether the location is storing valid information.

Once information has been stored in the CAM entries (each entry containing a plurality of CAM cells), it can be found by writing a search expression to a comparand register of the CAM. Each CAM entry is associated with a local match detection circuit, which returns a "match" or "no match" indication based on a comparison between the content of the comparand register and the local CAM entry. If at least one local match detection circuit returns a "match" indication, the search is successful and the address of the CAM entry matching the search expression may also be output by the CAM. If multiple CAM cells return a "match" indication, the CAM may have a priority encoder and only output the address of the highest priority matching CAM entry. Thus, in contrast to conventional memory devices, in a CAM the user supplies the data and gets back an address if there is at least one match found in the CAM.

In many network devices, there is a need to gather statistics relating to the operation of the network device and/or the network traffic processed by the device. For example, a router may compile statistics relating to the amount of traffic processed over a given period of time, perhaps organized or divided into subcategories (e.g., by source and/or destination addresses, packet size distribution, time of day, etc.) The router can be programmed with an expected baseline for the statistics it gathers and the router could also alert a network administrator if the statistics gathered by the router deviate beyond a predetermined threshold from the norm. Such an ability may alert an network administrator to possible configuration errors, malfunctions, or attacks. Traditionally, network statistics are maintained using dedicated circuits and/or software routines which gather and maintain network statistics in reserved memory locations and/or registers. The use of dedicated circuits and/or software routines is not efficient and may not be sufficiently flexible. Accordingly, there is a desire and need for an efficient and flexible method and apparatus to gather statistics.

SUMMARY OF THE INVENTION

The present invention is directed to a content addressable memory (CAM) device which is adapted to function as the central component of a statistics gathering unit for a processing system. The processing system is modified to present to the CAM for search, a series of status words, while the CAM has a number of cells programmed to match status words signifying events of statistical interest. The CAM is modified so that each CAM entry is associated with a counter, which can be read, written, incremented, or reset. Additionally, the CAM includes at least one processing unit, which can be used to perform mathematical operation upon CAM values. Generally, whenever a CAM entry matches a status word, the counter associated with each matching CAM entry is incremented. However, in some embodiments, if multiple CAM entries match a status word, only the highest priority entry increments its counter. In other embodiments, instead of The statistic can be obtained by reading the counter value portion of the CAM cell.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

Figure 1:
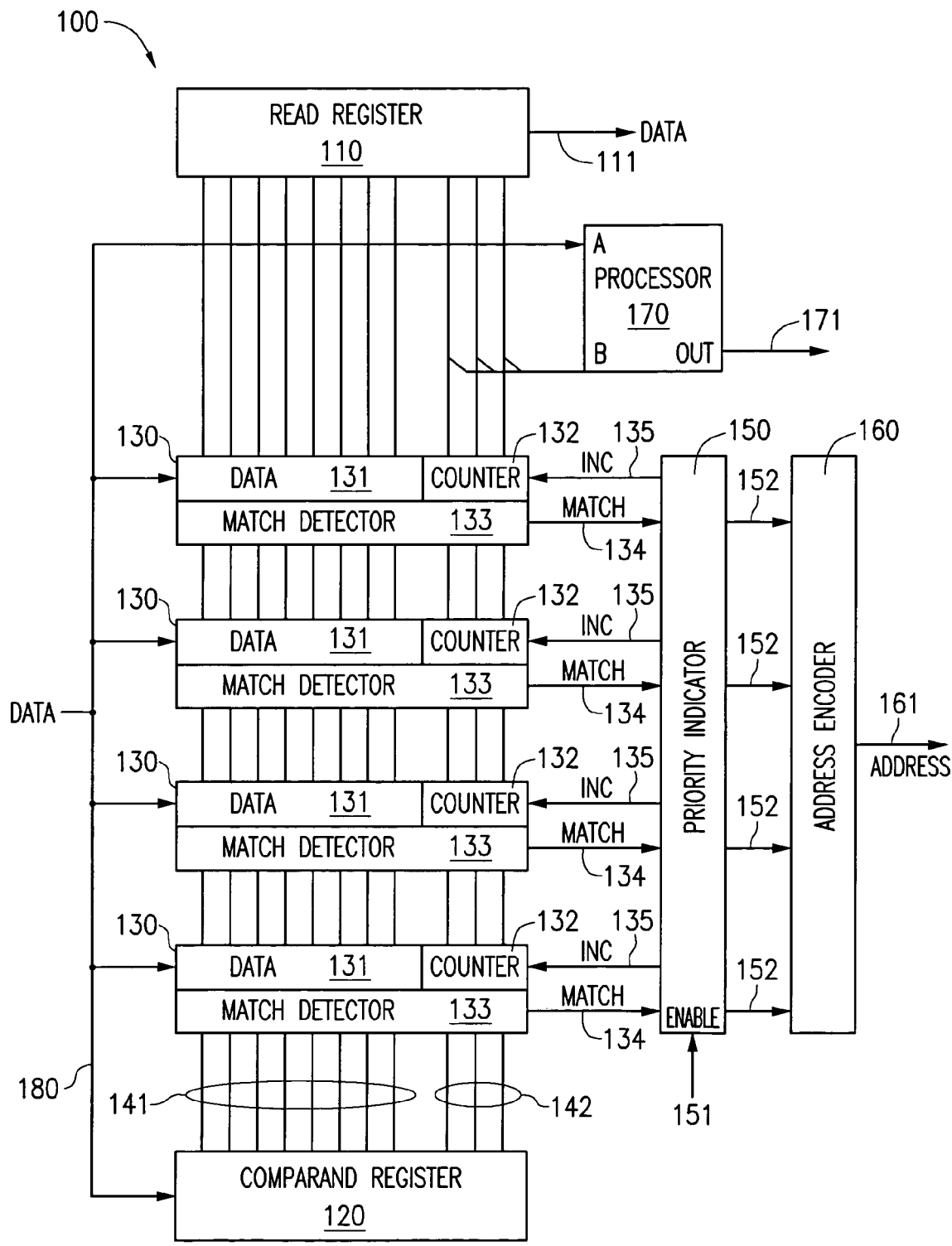
FIG. 1 is a block diagram of a CAM memory device implementing the invention.

Now referring to the drawings, where like reference numerals designate like elements, there is shown in FIG. 1 a CAM device 100. The CAM device 100 is preferably a ternary CAM device, although the present invention may also be practiced using a binary CAM device. The CAM device 100 includes a read register 110 for buffering data to be read out of the CAM device 100 on line 111. The read register 120 is coupled to the comparand register 120 and a plurality of CAM entries 130 using lines 141–142. Although not illustrated in FIG. 1, some CAM devices may also include a write register. A write register is a register similar to the read register 110, but used to buffer write data instead of read data. Further, while FIG. 1 illustrates a single set of lines 141–142, some CAM devices may use multiple sets of lines. For example, a first set of lines may couple the comparand register to each CAM entry while a second set of lines may couple the read/write register(s) to each CAM entry.

The plurality of CAM entries 130 each comprise a first data storage portion DATA 131 for holding data, and a second data storage portion COUNTER 132 for holding a counter value. The COUNTER 132 can be incremented by setting the INC line 135 to a predetermined state. (It should be noted other embodiments may include counters which are decremented instead of being incremented, or counters which can be incremented or decremented.) Both the DATA 131 and COUNTER 132 portions are coupled via lines 141, 142, respectively, to the read register 110, so that both portions may be read out of the CAM device. Each CAM entry 130 additionally includes a match detector circuit 133. The match detector circuit 130 asserts a MATCH signal on line 134 if the DATA 131 and COUNTER 132 content match the search expression stored in comparand 120.

The MATCH signal is supplied via line 134 to the priority indicator 150, which may assert the increment signal INC on each line 135 which corresponds to a matching CAM entry, or on only the line 135 which corresponds to the highest priority matching entry. The behavior of the priority indicator 150 can be switched between these two modes by changing the logical state of the line 151 attached to the ENABLE terminal of the priority encoder. The priority encoder is further coupled via lines 152 to an address encoder 160, and outputs the matching addresses having the highest priority on line 161.

The CAM device 100 further includes a processor 170, which is coupled to both the data line 180, used to supply data to the CAM device 100, as well as lines 142 used to carry the content of the counter values. The processor 170 outputs the result of its processing on line 171. The processor 170 can therefore be used to perform mathematical operations on counter values. At a minimum, the processor 170 must include an adder, so that counter values can be added or subtracted. However, the processor 170 may also be much more sophisticated than an adder, and may be, for example, a multi-function mathematics processor, or a microprocessor. In general, the processor 170 may be used to further post process the counter values in order to facilitate the computation of statistical information.

Figure 2:
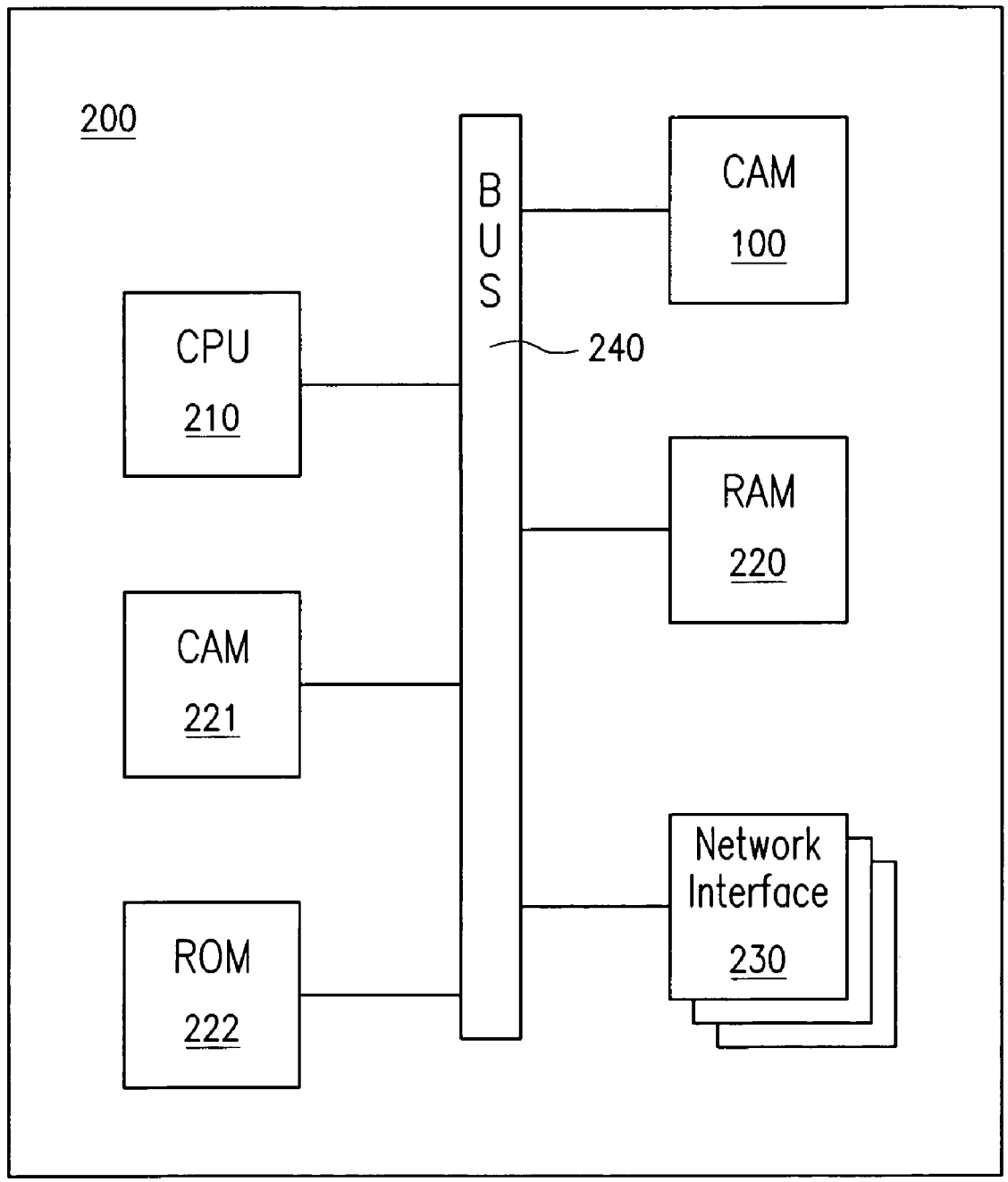
FIG. 2 is a block diagram of processor based system utilizing the CAM memory device of the present invention.

FIG. 2 is an illustration of a processor based system 200 designed for use with the CAM device 100 of FIG. 1. As illustrated, the system 200 is a network router, however, the system 200 may be any type of system which may benefit from the statistic support which can be provided by the CAM device 100. The router 200 includes a central processor (CPU) 210 coupled to a bus 240. Also coupled to the bus 240 is the CAM device 100 of FIG. 1, a random access memory (RAM) 220, a conventional CAM device 221, a read only memory (ROM) 222, and a plurality of network interfaces 230.

The router 200 operates by having the CPU 210 execute a boot-up routine stored in the ROM 222, which causes the router 220 to accept configuration data from one of the network interfaces 230. The configuration data is used to set up routing information, which may be stored in the RAM 220. Addition information may also be stored in the conventional CAM 221. Once configured, the router 200 accepts network packets from at least one of the network interfaces 230, analyzes certain fields of each accept packet, including, for example, source and destination addresses. The CPU 210, with the help of the information in RAM 220 and conventional CAM device 221, determines whether to forward the packet from one of the plurality of network interfaces 230 to another one of the plurality of network interfaces.

In order to utilize the statistical support feature of the CAM device 100 of FIG. 1, the relevant parameters which define the operation of a system 200 must be identified. For example, one statistic which may be helpful for capacity planning may include the identification of the number of packets forwarded to or received from a particular network, or network node. In order to perform this analysis, the source and destination addresses of each packet must be analyzed. Thus, source address and destination address fields will be relevant parameters for the router 200. Similarly, since packets can vary in size, it may be useful to develop an understanding of the distribution of packet sizes for the packets processed by the router 200. In order to perform this analysis, its clear that the packet size field must be analyzed. Thus, the packet size field of a packet will be a relevant parameter for the router 200. In some instances, combinations between different statistics may also be helpful. For example, packet size distribution may vary between different networks. Thus, source address, destination address, and packet size are relevant parameters if statistics relating to packet size distribution by network is required.

Figure 3A:
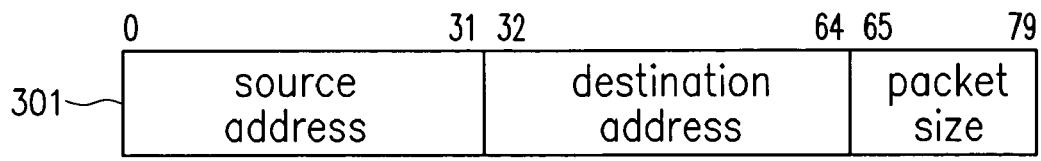
FIGS. 3A, 3B, and 3C are exemplary diagrams of a status word and CAM entries for ternary and binary CAMs, respectively.

Once the relevant parameters have been identified, the CPU 210 (or another processing element) of the system 200 can be programmed to present as a search word to the CAM 100 of FIG. 1, a status word having fields corresponding to the relevant parameters. In the above discussed example, the relevant fields are each packet's source address, destination address, and packet size. If the addresses are, for example, TCP/IP addresses, the source and destination addresses would each be 32-bit addresses. The packet size might be a 16-bit field. Referring now to FIG. 3A, an example of a status word 301 which could be generated would be a 80-bit field comprising a 32-bit source address, a 32-bit destination address, and a 16-bit packet length field which specifies in bytes, the size of the packet.

Figure 3B:
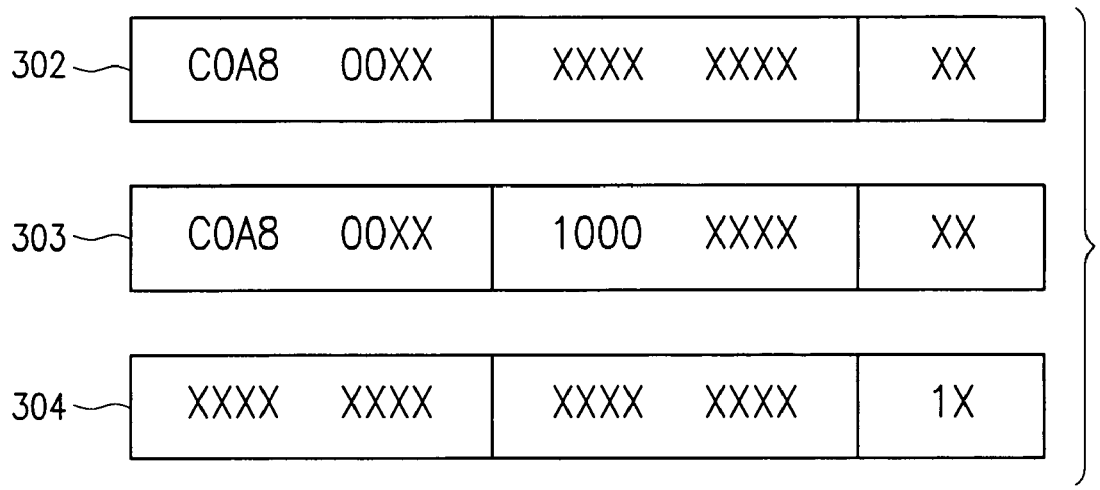
Figure 3C:
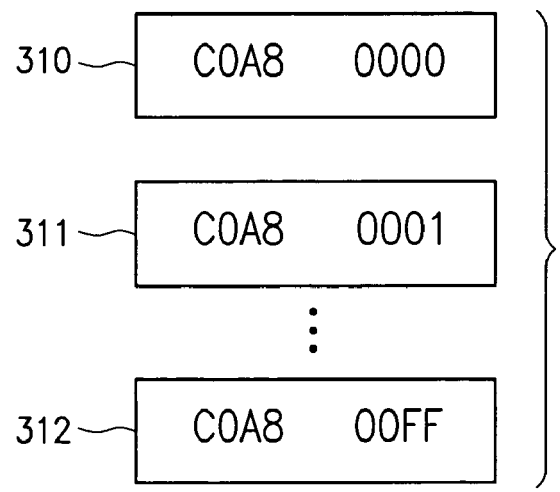

The CPU 210 of the router 200 would also write certain entries of the CAM 100, in the same format of the status word, to correspond to the statistics to be gathered. For example, if one statistic we wanted to gather is the number of packets processed by the router which originated in a network having TCP/IP addresses ranging from 192.168.0.0 to 192.168.0.255, one CAM entry 302 (FIG. 3B) in CAM 100 may have its data portion encoded as (hexadecimal) "C0A8 00XX XXXX XXXX XX," where C0 hexadecimal equals 192 decimal, A8 hexadecimal equals 168 decimal, 00 hexadecimal equals 0 decimal, and XX corresponds to "don't care." If we additionally wanted to know how many packets were originating from the TCP/IP address range of 192.168.0.0 to 192.168.0.255 and heading to a TCP/IP address in the range of 10.0.0.0 to 10.0.255.255, the CPU 210 would construct another CAM entry 303 encoded as (hexadecimal) "C0A8 00XX 1000 XXXX XX," where 10 hexadecimal equals 10 decimal. The CPU 210 of the router would also reset the COUNTER 132 portion of both CAM entries to zero. Similarly, to count the number of packets processed by the router 200 have a packet length between 16 to 31 bytes, the CPU 210 would construct a CAM entry 304 encoded as (hexadecimal) "XXXX XXXX XXXX XXXX 1X."

During normal operation of the router, the CPU 210 will construct a status word for each packet processed, and present that status word as a search term in the comparand register 120 of the CAM device 100. The first CAM entry 302 will match any packet having an originating TCP/IP address in the range of 192.168.0.0–192.168.0.255 regardless of destination while the second CAM entry 303 will match any packet having the specified originating address and having a destination address between 10.0.0.0–10.0.255.255. The third CAM entry 304 will match any status word indicating a packet having a length between 16 and 31 bytes, regardless of source or destination address. In order to properly count each statistic, line 151 (FIG. 1) should be set to a logical state which cause the priority indicator circuit 150 to cause every matching CAM entry to increment its counter. At any given time, the statistics can be accessed by reading the three CAM entries 302–304 and extracting their respective counter value fields.

Note that the CAM 100 is preferably a ternary CAM, so that it may store entries having "don't care" states. This is advantageous because it permits one CAM entry to match a wide range of status words. However, the CAM 100 may also be a binary CAM, albeit at an expense of using more CAM entries and being more limited. For example, assume that the relevant parameters for the router 200 is only the originating TCP/IP address and thus the status word is 32-bit wide instead of 80-bit wide. In order to compile statistics regarding the number of packets originating from the network having TCP/IP addresses of 192.168.0.0 to 192.168.0.255, a binary CAM would require the CPU 210 to write 256 CAM entries 310, 311, 312, namely (hexadecimal) C0A8 0000, C0A8 0001, . . . , C0A800FF. In order to extract the statistics, the counter values of the 256 CAM entries will need to be summed using, for example, processor 170.

The present invention therefore provides for a CAM architecture which integrates a counter into the CAM cell. The counter can be changed, i.e., incremented and/or decremented, using a signal, which is coupled to a priority indicator circuit 150. Additionally, the counter can be read or written as it is also a sequence of bits in each CAM entry. A system which requires statistics support can utilize the CAM of the present invention to flexibly and quickly gather statistical data by programming the entries of the CAM to correspond to the desired statistics and presenting to the CAM a status word for search for each processing activity. A processor in the CAM can further facilitate the computation of statistical data by performing mathematical operations upon counter values.

While the invention has been described in detail in connection with the exemplary embodiment, it should be understood that the invention is not limited to the above disclosed embodiment. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed is:

1. A method of operating a content addressable memory (CAM) comprising:
    accepting a search word;
    simultaneously searching a plurality of data storage portions respectively containing a plurality of CAM entries with said search word to identify any matching CAM entries by a respective match signal; and
    incrementing or decrementing a counter portion associated with a data storage portion of at least one of said plurality of data storage portions having a matching CAM entry in response to a respective match signal associated with said matching CAM entry,
    wherein said counter portion is a sequence of bits in each CAM entry.

2. The method of claim 1, further comprising,
    outputting an address corresponding to at least one of any matching CAM entries.

3. The method of claim 1, wherein the counter portion associated with the one matched entry is incremented based on a priority of selection among all matching CAM entries.

4. The method of claim 3, wherein said priority selection is a highest priority selection.

5. The method of claim 1, further comprising:
    performing a mathematical operation using the counter portion associated with at least one of said plurality of CAM entries.

6. The method of claim 5, wherein said mathematical operation is the addition of the counter values of the counter portion.

7. The method of claim 1, further comprising:
    reading a CAM data;
    wherein said CAM data includes a data portion and a counter portion.

8. The method of claim 1, further comprising:
    writing a CAM data;
    wherein said CAM data includes a data portion and a counter portion.

9. The method of claim 1, wherein said step of simultaneously searching searches binary CAM entries.

10. The method of claim 1, wherein said step of simultaneously searching searches ternary CAM entries.

11. The method of claim 1, wherein said incrementing or decrementing step, increments or decrements the counter portion corresponding to a highest priority matching CAM entry.

12. A content addressable memory (CAM) device, comprising:
    a comparand register for storing a search expression;
    a read register;
    a plurality of CAM cells, said plurality of CAM cells coupled to said comparand register and said read register, each comprising,
    a data storage portion;
    a counter portion, said counter portion being a sequence of bits in each CAM entry;
    a match detection circuit for outputting a match signal if the contents of said data storage portion corresponds to said search expression; and
    a priority indicator, coupled to said plurality of CAM cells, for receiving match signals outputted by said match detection circuits, and for incrementing or decrementing a counter portion corresponding to at least one of said plurality of CAM cells generating a match signal.

13. The device of claim 12, further comprising, an address encoder, coupled to the priority encoder, for outputting an address corresponding to one of said plurality of the CAM cells providing an outputted match signal.

14. The device of claim 12, wherein said priority indicator increments or decrements the counter portion of every one of said plurality of CAM cells having an outputted match signal.

15. The device of claim 12, wherein said priority indicator increments or decrements the counter portion of only one of said plurality of CAM cells having an outputted match signal.

16. The device of claim 12, further comprising:

a mathematical processor, coupled to the counter portion of the plurality of CAM cells, for performing a mathematical operation using the counter value of at least one of said counter portions.

17. The device of claim 16, wherein said mathematical operation is the addition of the counter values.

18. The device of claim 16, wherein said mathematical processor is a multi-function processor.

19. The device of claim 12, wherein said priority indicator increments or decrements a counter portion corresponding to the highest priority CAM cell generating a match signal.

20. A system, comprising:

a processor;

a content addressable memory (CAM), coupled to said processor, said content addressable memory (CAM) device further comprising, a comparand register for storing a search expression;

a read register;

a plurality of CAM cells, said plurality of CAM cells coupled to said comparand register and said read register, each comprising, a data storage portion;

a counter portion, said counter portion being a sequence of bits in each CAM entry;

a match detection circuit for outputting a match signal if the contents of said data storage portion corresponds to said search expression; and a priority indicator, coupled to said plurality of CAM cells, for receiving match signals outputted by said match detection circuits, and for incrementing or decrementing a counter portion corresponding to at least one of said plurality of CAM cells generating a match signal.

21. The system of claim 20, further comprising, an address encoder, coupled to the priority encoder, for outputting an address corresponding to one of said plurality of the CAM entries cells providing an outputted match signal.

22. The system of claim 20, wherein said priority indicator increments or decrements the counter portion of every one of said plurality of CAM cells having an outputted match signal.

23. The system of claim 20, wherein said priority indicator increments or decrements the counter portion of only one of said plurality of CAM cells having an outputted match signal.

24. The system of claim 20, further comprising:

a mathematical processor, coupled to the counter portion of the plurality of CAM cells, for performing a mathematical operation using the counter value of at least one of said counter portions.

25. The system of claim 24, wherein said mathematical operation is the addition of the counter values.

26. The system of claim 24, wherein said mathematical processor is a multi-function processor.

27. The system of claim 20, wherein said priority indicator increments or decrements a counter portion corresponding to the highest priority CAM cell generating a match signal.

* * * * *

UNITED STATES PATENT AND TRADEMARK OFFICE
CERTIFICATE OF CORRECTION

PATENT NO.       : 7,089,352 B2
APPLICATION NO.  : 10/326633
DATED            : August 8, 2006
INVENTOR(S)      : Alon Regev et al.

It is certified that error appears in the above-identified patent and that said Letters Patent is hereby corrected as shown below:

Column 2, line 49, "of The" should read --of incrementing the counter, a mathamatical operation is preformed on the counter value. The--.

Signed and Sealed this

Twenty-seventh Day of February, 2007

JON W. DUDAS
*Director of the United States Patent and Trademark Office*